US005744250A

United States Patent [19]

Lee et al.

[11] Patent Number: 5,744,250
[45] Date of Patent: Apr. 28, 1998

[54] ADHESION COMPOSITIONS FOR MULTILAYER STRUCTURES

[75] Inventors: I-Hwa Lee, Wilmington; Stephen Robert Tanny, Newark; Anthony Matthew Angelo, Wilmington, all of Del.; Stewart Carl Feinberg, Exton, Pa.

[73] Assignee: E. I. du Pont de Nemours and Company, Wilmington, Del.

[21] Appl. No.: 761,682

[22] Filed: Dec. 6, 1996

Related U.S. Application Data

[63] Continuation of Ser. No. 516,034, Aug. 15, 1995, abandoned, which is a continuation-in-part of Ser. No. 312,955, Sep. 30, 1994, abandoned, which is a continuation-in-part of Ser. No. 174,860, Dec. 29, 1993, abandoned.

[51] Int. Cl.$^6$ ................................ B32B 27/08; B32B 27/32
[52] U.S. Cl. ................... 428/516; 428/515; 428/519; 428/523; 525/73; 525/78; 525/80
[58] Field of Search ....................... 525/71, 74, 78; 428/36.7, 500, 515, 516, 517, 519, 521, 523

[56] References Cited

U.S. PATENT DOCUMENTS

| | | | |
|---|---|---|---|
| 3,868,433 | 2/1975 | Bartz et al. | 525/78 |
| 4,198,327 | 4/1980 | Matsumoto et al. | 525/73 |
| 4,460,646 | 7/1984 | Inoue et al. | 428/344 |
| 4,619,972 | 10/1986 | Inoue | 525/193 |
| 4,684,576 | 8/1987 | Tabor et al. | 428/441 |
| 4,801,647 | 1/1989 | Wolfe, Jr. | 525/74 |
| 4,839,412 | 6/1989 | Harrell et al. | 524/436 |
| 4,997,872 | 3/1991 | Ohmae et al. | 525/74 |
| 5,053,457 | 10/1991 | Lee | 525/78 |
| 5,296,552 | 3/1994 | Ohmae et al. | 525/193 |
| 5,346,735 | 9/1994 | Logan et al. | 428/36.7 |
| 5,367,022 | 11/1994 | Kiang, et al. | 525/74 |

FOREIGN PATENT DOCUMENTS

| | | |
|---|---|---|
| 6159239 | 12/1981 | Japan . |
| 1019647 | 1/1986 | Japan . |

*Primary Examiner*—Mark L. Warzel
*Attorney, Agent, or Firm*—Monte R. Browder

[57] ABSTRACT

The present invention relates to bonding resins having excellent adhesion to polar polymers, particularly ionomers, acid copolymers and ethylene vinyl alcohol copolymer. These resins preferably contain: 1) an ethylene polymer or copolymer (ungrafted, grafted or partially grafted); 2) a grafted elastomer; and 3) optionally, an ethylene alpha olefin copolymer which is wholly or partially grafted. Preferred grafting comonomers include maleic anhydride and derivatives thereof.

2 Claims, No Drawings

ADHESION COMPOSITIONS FOR MULTILAYER STRUCTURES

CROSS-REFERENCE TO RELATED APPLICATION

This is a continuation of application Ser. No. 08/516,034 filed Aug. 15, 1995, now abandoned, which is a continuation-in-part of application Ser. No. 08/312,955 filed Sep. 30, 1994, which is a continuation-in-part of application Ser. No. 08/174,860 filed Dec. 29, 1993, both of which are now abandoned.

FIELD OF THE INVENTION

The present invention relates generally to bonding resins having excellent adhesion to polar polymers, particularly ionomers and acid copolymers. More specifically, the bonding resins of the present invention preferably comprise: 1) an olefinic ethylene polymer or copolymer; 2) a grafted elastomer; and 3) optionally, a grafted ethylene polymer

BACKGROUND OF THE INVENTION

Ionomer, acid copolymer, and similar-type polar polymeric materials are often used as packaging materials. In some packaging applications, these materials are incorporated into a multilayer packaging structure. Such multilayer packaging structures can be problematic due to inadequate adhesion between such materials and adjacent layers. The present invention is directed to an innovative bonding resin useful in securely bonding a polar polymeric material to provide a multilayer packaging structure.

SUMMARY OF THE INVENTION

Overview

The present invention is directed to a bonding resin composition comprising an olefinic material, a grafted elastomer and optionally, a grafted ethylene polymer. Preferably, all or part of the olefinic material is also grafted. Preferred bonding resin components will be discussed first, and thereafter combinations of such components and their uses will be described.

Olefinic Component

The preferred olefinic component comprises an ethylene alpha olefin copolymer, Polyolefin (A), or, optionally, a blend of at least 2 polyolefins (A) and (B). Polyolefin (A) and Polyolefin (B) are preferably combined in a ratio of about 1:99 to about 99:1 and more preferably about 5:95 to about 95:5.

Polyolefin (A)

Polyolefin (A) comprises a major portion (by weight) of ethylene which is preferrably copolymerized with another alpha olefin. The alpha olefin preferably contains 3 to about 20 carbon atoms and can represent up to about 20% by weight of the copolymer. Preferred alpha olefins are propylene, 1-butene, 1-hexene, 4-methy-1-pentene, 1-octene, 1-decene, 1-tetradecene, 1-octadecen, etc., and these alpha olefins may be used either singularly or in admixtures of two or more. Particularly preferred are propylene, 1-butene, 1-hexene, 1-octene and 4-methyl-1-pentene. Blends of two or more of these ethylene alpha olefin copolymers can also be used in accordance with the present invention. Ethylene copolymers having small amounts of a diolefin component such as butadiene, norbornadiene, hexadiene and isoprene are also generally suitable, although less preferred. Thus, a wide variety of olefinic polymers and copolymers can be used in accordance with the present invention.

The most preferred form of Polyolefin (A) is an ethylene alpha olefin copolymer having the following characteristics:

a) a density of about 0.840 to about 0.915, more preferably about 0.85 to about 0.915;

b) a melt index, measured according to ASTM D-1238, of about 0.1 to about 50, more preferably about 0.3 to about 40 and most preferably about 0.5 to about 30; and c) a polydispersity of greater than about 1.1, where polydispersity is defined as the ratio of weight average molecular weight divided by number average molecular weight (molecular weight distribution is measured according to ASTM D5296-92 with the following exceptions: i) trichlorobenzene is used as the solvent for the polyolefin; and ii) the column temperature is 135° C.).

Optionally, all or part of Polyolefin (A) can be grafted with a mono- or multi-carboxylic acid moiety (or an anhydride derivative of a carboxylic acid moity), by polymerizing a grafting monomer having vinyl or allylic functionality and the acid or anhydride moity. Further discussion of appropriate grafting monomers is provided in the section below entitled "Carboxylic Grafting Monomers". Other grafting monomers, such as styrene and/or vinyl acetate can also be used in place of or in addition to the carboxylic grafting monomers of Polyolefin (A). The olefinic component can optionally be grafted by incorporating from about 0.02 to about 15 parts, more preferably about 0.03 to about 10 parts and most preferably about 0.04 to about 8 parts grafting monomer by weight based on 100 parts by weight of olefinic component.

The olefinic component is preferably produced by any process well known in the art including those utilizing a Ziegler-type catalyst or a metallocene type catalyst. Such processes for polyethylene polymer and copolymer are well known and need not be described further (the term "copolymer" is intended to include two or more monomer constituents and substituted derivatives thereof).

Polyolefin (B) Modifier

Polyolefin (B) can optionally be used as a modifer in the present invention. Polyolefin (B) preferably comprises either a homopolymer of ethylene or a copolymer of ethylene with an alpha olefin which is grafted all or in part with a carboxylic grafting monomer. The alpha olefin preferably contains 3 to about 20 carbon atoms and can represent up to about 20% by weight of the copolymer. Preferred alpha olefins are propylene, 1-butene, 1-hexene, 4-methy-1-pentene, 1-octene, 1-decene, 1-tetradecene, 1-octadecene, etc., and these alpha olefins may be used either singularly or in admixtures of two or more. Particularly preferred are propylene, 1-butene, 1-hexene, 1-octene and 4-methyl-1-pentene. Blends of two or more of these ethylene alpha olefin copolymers, two or more ethylene homopolymers or blends of ethylene homopolymers with ethylene alpha olefin copolymers can also be used in accordance with the present invention.

The most preferred form of Polyolefin (B) comprises an ethylene homopolymer or an ethylene alpha olefin copolymer having the following characteristics:

a) a density of about 0.840 to about 0.970, more preferably about 0.850 to about 0.965 and even more preferably about 0.860 to about 0.965;

b) a melt index, measured according to ASTM D-1238, of about 0.1 to about 50, more preferably about 0.3 to about 40 and even more preferably about 0.5 to about 25; and c) a polydispersity of greater than about 1.1, where polydispersity is defined as the ratio of weight average molecular weight divided by number average molecular weight (molecular weight distribution is measured according to ASTM D5296-92 with the following exceptions: i) trichlorobenzene is used as the solvent for the polyolefin; and ii) the column temperature is 135° C.).

All or part of Polyolefin (B) is grafted with a mono- or multi-carboxylic acid moiety (or an anhydride derivative of a carboxylic acid moiety), by polymerizing a grain monomer having vinyl or allylic functionality and the acid or anhydride moiety. Further discussion of appropriate grafting monomers is provided in the section below entitled "Carboxylic Grafting Monomers". Other grafting monomers, such as styrene and/or vinyl acetate can also be used in addition to the carboxylic grafting monomers of Polyolefin (B). The olefinic component can be grafted by incorporating from about 0.02 to about 15 parts, more preferably about 0.03 to about 10 parts and most preferably about 0.04 to about 8 parts grafting monomer by weight based on 100 parts by weight of olefinic component.

Carboxylic Grafting Monomers

The preferred grafting monomers are unsaturated carboxylic acids or the anhydrides thereof, such as, acrylic acid, methacrylic acid, fumaric acid, maleic acid, maleic anhydride, citraconic acid, citraconic anhydride, itaconic acid, itaconic anhydride, 3a, 4,7,7a-tetrahydromethyl-4,7-methanolisobenzyofuran-1,3 dione, endo-bicyclo-[2.2.1]-5-heptene-2,3-dicarboxylic acid, endo-bicyclo-[2.2.1]-5-heptene-2,3-dicarboxylic anhydride, cis-4-cyclohexene-1,2-dicarboxylic acid, and cis-4-cyclohexene-1,2-dicarboxylic anhydride. Metal salts, anhydrides, esters, amides or imides of the above acids can also be useful. Ordinary skill and experimentation may be necessary in selecting any particular grafting monomer, depending upon the performance requirements of the particular application. Maleic anhydride and acrylic acid are especially preferred.

The method for grafting of the grafting comonomer onto the ethylene copolymer can be any of the processes which are well known in the art. For example, grafting can be carried out in the melt without a solvent, as disclosed in European Patent Application No. 0 266 994, or in solution, or dispersion or in a fluidized bed. Melt grafting can be done using a heated extruded, a Brabender® or a Banbury® mixer or other internal mixers or kneading machines, roll mills, or the like. The grafting may be carried out in the presence or absence of a radical initiator such as a suitable organic peroxide, organic perester, or organic hydroperoxide. The graft copolymers are recovered by any method which separates or utilizes the graft polymer that is formed. Thus, the graft copolymer can be recovered in the form of precipitated fluff, pellets, powders and the like.

Elastomer Component

Elastomers useful for the present invention include:

1. copolymer elastomers of ethylene and an alpha-olefin selected from the group consisting of propylene, butene-1, pentene-1, hexene-1, octene-1, and 4-methylpentene-1;

2. ethylene-propylene-nonconjugated diene rubber (EPDM);

3. isoprene rubber (IR);

4. butyl rubber;

5. styrene-butadiene thermoplastic rubber (SBR);

6. styrene-isoprene thermoplastic rubber;

7. polyisobutylene;

8. styrene ethylene-butylene rubber; and 9. mixtures or derivatives thereof.

All or part of the Elastomer Component is grafted with a mono- or multi-carboxylic acid moiety (or an anhydride derivative of a carboxylic acid moiety), by polymerizing a grafting monomer having vinyl or allylic finctionality and the acid or anhydride moiety. Further discussion of appropriate grafting monomers is provided in the section entitled "Carboxylic Grafting Monomers". Other grafting monomers, such as styrene and/or vinyl acetate can also be used in addition to the carboxylic grafting monomers of the Elastomer Component.

The amount of unsaturated carboxylic acid or its anhydride is preferably about 0.005 to 5.0 parts by weight, more preferably about 0.03 to about 5.0 parts by weight, per 100 parts by weight of the elastomer. Desirably, the elastomer is modified completely. However, the addition of unmodified elastomer can also be appropriate.

The modified elastomer of this invention can be produced by adding the unsaturated carboxylic acid or its anhydride to the elastomer and mixing them in a mixer such as a single or multi screw extruded, a ribbon blender, a V-shaped blender or tumbler, and melting and kneading the mixture at 120° to 300° C., either in the presence of or absence of a radical initiator. Alternatively, it can be obtained by dispersing the aforesaid copolymer substrate and the unsaturated carboxylic acid or its anhydride in water or an organic solvent, and heating the dispersion in the presence of the aforesaid radical generator or a water-soluble peroxide.

Optional Additives

Other optional additives are also appropriate, particularly resin and/or polymeric tackifiers. Generally the tackifiers comprise natural rosins, hydrogenated rosins, polyterpenes, terpene-phenolics, rosin esters, atactic polypropylene, petroleum hydrocarbon resins, and the like.

Various miscellaneous additives can also be incorporated in the novel adhesive formulations of this invention. Of particular utility in adjusting viscosity and hardness is the use of waxes or the wax-like materials including, for example, petroleum waxes such as paraffin and microcrystalline wax, or synthetic waxes such as Fischer-Tropsch wax. If required, the blend of the invention may contain various additives such as antioxidants, ultraviolet absorbers, surface modification agents such as slip and/or antiblock additives, antistatic agents, mold releasing agents, lubricants, pigments, etc.

Final Composition

The final composition preferrably comprises olefinic component and elastomer component in a weight ratio of from about 99:1 to about 1:99, more preferably about 99:1 to about 60:40 and even more preferably from about 99:1 to about 65:35. For example, the olefinic component and the elastomer component can be mixed with a grafting monomer or a derivative thereof and an initiator of organic peroxide by a Henschel mixer or ribbon blender and then melted and kneaded by a Banbury® mixer or a single- or multi-screw extruder at a temperature higher than the melting point of the olefinic component but lower than 300° C. Examples of organic peroxides include di-t-butyl peroxide, 2,5-dimethyl-2,5-di-(t-butylperoxy)-hexyne-3, dicumyl peroxide, and benzoyl peroxide. For synthetic rubber in the form of bale, a Banbury® mixer or roll mill is suitable for heating, melting, and mixing.

The reaction may be carried out in such a manner that aforesaid mixture of olefinic component and elastomer component is dissolved in a solvent and a grafting monomer (or a derivative thereof) and an initiator is added to the solution.

In preparing the adhesive compositions of the present invention, the polyolefin and the elastomer components can be preblended before undergoing grafting as previously described. Conversely, either one of these components can be grafted separately and then blended with the other component (or both can be grafted separately and then blended) in a high shear mixer such as a Banbury®, mill, kneader, mixing extruder, etc.

Alternatively, grafting can be conducted by high pressure copolymerization with ethylene and other comonomers. The grafting can be accomplished by any method known in the art. For example, grafting can be carried out in the heat melted state without solvent or it may be carried out in solution or dispersion (the former can be done on a heated extruder, a Brabender® mixer, a Banbury® mixer, roll mills or the like).

The modified polymer can be used directly or it can be blended down with an unmodified polyolefin resin or a mixture of unmodified polyolefin resins. It is not necessary that the unmodified polyolefin resin be identical to the polymer base of the modified polymer.

Films and Multilayer Stuctures

Films and coatings can be made from the compositions of the present invention and laminated or coated onto other films or structures made from polar monomers, metal foils or sheets, and nonpolar polymers. Alternatively, the composition of the present invention can be simultaneously coextruded with polar polymers, such as but not limited to, ethylene vinyl alcohol copolymer, polyamide, polyester and polycarbonate, and nonpolar polymers. To summarize, the graft copolymers of the present invention have outstanding utility due to their unique chemical and physical properties as bonding agents, adhesives and coatings. The graft copolymers are expecially good as adhesives for polar polymeric materials and metals and can be used in forms such as adhesive sheets, tapes, or laminated products. They can be added to conventional adhesive compositions and can also be added to conventional polyolefins to allow the polyolefin to perform as an adhesive.

The final adhesive composition can be used directly, for example in a melt coextruction, or it can be extruded in rope or pellet form or reduced to a chip or powder form for use in an appropriate applicator. It can be cast or extruded into a film or web form for subsequent use. In such shaped forms, it can be placed between the substances to be bonded and then activated by heat and pressure. It should be noted that the adhesives of this invention can be applied by any of the hot melt applicators commonly used by the practitioner.

Although these compositions can be applied in any thickness the practitioner finds expedient, it is preferred to employ coating thickness of from 0.0002 mil to 10 mils.

DETAILED DESCRIPTION OF THE BEST MODE AND PREFERRED EMBODIMENT(S)

The adhesive blends were prepared by dryblending the ingredients together in a polyethylene bag and subsequently melt blending in a 30 mm Werner and Pfleiderer™ extruder. The melt temperature was 225° C. to 250° C. Each of the blends listed in the table also contained about 0.1 weight percent Irganox™ 1010 hindered polyphenol stabilizer (not separately reported in the tables).

Examples 1–6 and Comparative Examples C1–C10

In the examples of Table 1, the adhesive blends were coextruded between a layer of high density polyethylene, melt index 0.45 dg/min, and a layer of sodium ionomer resin copolymer with a melt flow index of 1.8 dg/min and density of 0.94 g/cc derived from ethylene methacrylic acid. The adhesive blends were melted at 181° C. in a 25 mm single screw extruder operated at 18 r.p.m. The high density polyethylene was melted at 215° C. in a 25 mm single screw extruder operating at 43 r.p.m. The sodium ionomer was melted at 201° C. in a 25 mm single screw extruder operating at 43 r.p.m. All 3 melt streams were fed through a Brampton™ coextrusion blown film die so as to form a three layer film with the high density polyethylene at 45 microns, the interposing adhesive layer at 18 microns and the ionomer at 43 microns. The film was run at 10 feet per minute through the take-up rolls.

The multilayered structures so prepared were evaluated by measuring their peel strengths. Peel strengths were measured by ASTM D 1876-72, modified in that the test was run with 3 to 6 duplicates of each sample, rather than 10. The test was further modified in that the width of the peel strips was 6.4 mm instead of 25 mm. Results from this test are reported in grams per 25 mm in Table 1.

All failures in Table 1 occurred at the interface between the adhesive blend and the ionomer. The results show that addition of a modified elastomer, as described in the invention, gives improved bonding to the ionomer compared to the equivalent composition containing unmodified elastomer. For instance, examples 1–3, which contain grafted elastomer, have improved peel strength to the ionomer over comparative examples C1–C3, which differ from examples 1–3 only in containing ungrafted elastomer. Similarly, comparative example C7, a very low density polyethylene with no grafted elastomer shows poorer peel strength to the ionomer than examples 1–3.

Examples 4–6 also show improved bonding to the ionomer because they contain grafted elastomer. Comparative Examples C4–C6, which differ from Examples 4–6 only by the unmodified elastomer, have lower peel strength than Examples 4–6. Comparative Examples C8–C10 differ from Examples 4–6 by having no ungrafted elastomer; these also have lower bond strength to the ionomer than Examples 4–6.

Examples 7–39 and Comparative Examples C11–C18

In the examples of Table 2, the adhesive blends were coextruded between a layer of sodium ionomer resin with a melt flow index of 1.8 dg/min and density of 0.94 g/cc derived from ethylene methacrylic acid copolymer, and a layer of a copolymer of 32 mole % ethylene and vinyl alcohol with a melt flow index of 3. The adhesive blends were melted at 215° C. in a 25 mm single screw extruder operated at 25 r.p.m. The ethylene vinyl alcohol was melted at 229° C. in a 25 mm single screw extruder operating at 43 r.p.m. The sodium ionomer was melted at 230° C. in a 25 mm single screw extruder operating at 70 r.p.m. All 3 melt streams were fed through a Brampton™ coextrusion blown film die so as to form a three layer film with the ionomer at 51 microns, the interposing adhesive layer at 13 microns and the ethylene vinyl alcohol at 23 microns. The film was run at 17.5 feet per minute through the take-up rolls.

The results show that examples 7 through 39 give good peel values because the density of the ethylene alpha-olefin of Polyolefin (A) of the olefinic component lies in the density range between 0.870 and 0.915 grams per cubic centimeter. The comparative examples C11 through C18 show poor results because the density of ethylene alpha-olefin polymer falls outside the range of densities claimed by this invention.

TABLE 1

| Examples | Ethylene Alpha-Olefin Polyolefin A | Density of Ethylene Alpha-Olefin | Weight % Ethylene Alpha-Olefin | Modified Ethylene Alpha-Olefin Polyolefin B | Weight % Modified Ethylene Alpha-Olefin | Elastomer Type | Weight % Elastomer | % MAN in Blend | PEEL gm/25 mm |
|---|---|---|---|---|---|---|---|---|---|
| 1  | EBP | 0.895 | 90  | —    | 0  | HC-1 | 10 | 0.20 | 1725 |
| 2  | EBP | 0.895 | 80  | —    | 0  | HC-1 | 20 | 0.40 | 1834 |
| 3  | EBP | 0.895 | 70  | —    | 0  | HC-1 | 30 | 0.61 | 1889 |
| C1 | EBP | 0.895 | 90  | —    | 0  | HC-4 | 10 | 0    | 1344 |
| C2 | EBP | 0.895 | 80  | —    | 0  | HC-4 | 20 | 0    | 1362 |
| C3 | EBP | 0.895 | 70  | —    | 0  | HC-4 | 30 | 0    | 1326 |
| 4  | EBP | 0.895 | 75  | FB-2 | 5  | HC-1 | 20 | 0.45 | 1961 |
| 5  | EBP | 0.895 | 70  | FB-2 | 10 | HC-1 | 20 | 0.50 | 1961 |
| 6  | EBP | 0.895 | 65  | FB-2 | 15 | HC-1 | 20 | 0.55 | 2107 |
| C4 | EBP | 0.895 | 75  | FB-2 | 5  | HC-4 | 20 | 0.05 | 1689 |
| C5 | EBP | 0.895 | 70  | FB-2 | 10 | HC-4 | 20 | 0.10 | 1616 |
| C6 | EBP | 0.895 | 70  | FB-2 | 15 | HC-4 | 20 | 0.15 | 1326 |
| C7 | EBP | 0.895 | 100 | —    | 0  | —    | 0  | 0    | 1126 |
| C8 | EBP | 0.895 | 95  | FB-2 | 5  | —    | 0  | 0.05 | 1689 |
| C9 | EBP | 0.895 | 90  | FB-2 | 10 | —    | 0  | 0.10 | 1017 |
| C10| EBP | 0.895 | 85  | FB-2 | 15 | —    | 0  | 0.15 | 926  |

EBP = ethylene—butene—propylene polymer, melt index = 12
FB-2 = high density polyethylene, grafted with 0.97 weight % maleic anhydride, melt index = 11
HC-1 = ethylene—propylene diene rubber, grafted with 2.02 weight % maleic anhydride, melt index = 3
HC-4 = ungrafted ethylene propylene diene rubber

TABLE 2

| Examples | Ethylene Alpha-Olefin Polyolefin A | Density of Ethylene Alpha-Olefin | Weight % Ethylene Alpha-Olefin | Modified Ethylene Alpha-Olefin Polyolefin B | Weight % Modified Ethylene Alpha-Olefin | Elastomer Type | Weight % Elastomer | Total % MAN in Adhesive Blend | PEEL gm/25 mm |
|---|---|---|---|---|---|---|---|---|---|
| 7  | EB-1 | 0.884 | 75 | FB-1 | 15 | HC-1 | 10 | 0.33 | 1480 |
| 8  | EB-1 | 0.884 | 75 | FB-2 | 15 | HC-1 | 10 | 0.35 | 1648 |
| 9  | EB-1 | 0.884 | 75 | FB-3 | 15 | HC-2 | 10 | 0.28 | 1226 |
| 10 | EB-1 | 0.884 | 75 | FB-2 | 15 | HC-2 | 10 | 0.32 | 1230 |
| 11 | EB-1 | 0.884 | 65 | FB-4 | 15 | HC-1 | 20 | 0.56 | 1167 |
| 12 | EB-1 | 0.884 | 65 | FB-4 | 15 | HC-1 | 20 | 0.56 | 1448 |
| 13 | EB-1 | 0.884 | 55 | FB-3 | 15 | HC-1 | 30 | 0.72 | 1239 |
| 14 | EB-1 | 0.884 | 55 | FB-2 | 15 | HC-1 | 30 | 0.76 | 1621 |
| 15 | EB-1 | 0.884 | 55 | FB-1 | 15 | HC-2 | 30 | 0.66 | 1194 |
| 16 | EB-1 | 0.884 | 55 | FB-4 | 15 | HC-2 | 30 | 0.68 | 926  |
| 17 | EB-1 | 0.884 | 55 | FB-3 | 15 | HC-3 | 30 | 0.41 | 1285 |
| 18 | EBP  | 0.895 | 70 | FB-1 | 15 | HC-1 | 15 | 0.44 | 1848 |
| 19 | EBP  | 0.895 | 55 | FB-4 | 15 | HC-1 | 30 | 0.77 | 1575 |
| 20 | EB-3 | 0.905 | 70 | FB-1 | 15 | HC-1 | 15 | 0.46 | 844  |
| 21 | EB-3 | 0.905 | 70 | FB-1 | 15 | HC-1 | 15 | 0.46 | 781  |
| 22 | EB-3 | 0.905 | 70 | FB-2 | 15 | HC-1 | 15 | 0.45 | 627  |
| 23 | EB-3 | 0.905 | 55 | FB-4 | 15 | HC-1 | 30 | 0.77 | 1044 |
| 24 | EBP  | 0.895 | 90 | —    | 0  | HC-1 | 10 | 0.20 | 1289 |
| 25 | EBP  | 0.895 | 80 | —    | 0  | HC-1 | 20 | 0.40 | 1108 |
| 26 | EBP  | 0.895 | 70 | —    | 0  | HC-1 | 30 | 0.61 | 1235 |
| 27 | EB-1 | 0.884 | 85 | —    | 0  | HC-1 | 15 | 0.30 | 1162 |
| 28 | EBP  | 0.895 | 75 | FB-2 | 5  | HC-1 | 20 | 0.45 | 1362 |
| 29 | EBP  | 0.895 | 70 | FB-2 | 10 | HC-1 | 20 | 0.50 | 1398 |
| 30 | EBP  | 0.895 | 65 | FB-2 | 15 | HC-1 | 20 | 0.55 | 1507 |
| 31 | EBP  | 0.895 | 60 | FB-2 | 15 | HC-1 | 15 | 0.45 | 1525 |
|    | EB-1 | 0.884 | 10 |      |    |      |    |      |      |
| 32 | EBP  | 0.895 | 55 | FB-2 | 15 | HC-1 | 15 | 0.45 | 1489 |
|    | EB-1 | 0.884 | 15 |      |    |      |    |      |      |
| 33 | EBP  | 0.895 | 50 | FB-2 | 15 | HC-1 | 15 | 0.45 | 1598 |
|    | EB-1 | 0.884 | 20 |      |    |      |    |      |      |
| 34 | EBP  | 0.895 | 55 | FB-2 | 15 | HC-1 | 15 | 0.45 | 1071 |
|    | EB-4 | 0.885 | 15 |      |    |      |    |      |      |
| 35 | EBP  | 0.895 | 45 | FB-2 | 15 | HC-1 | 15 | 0.45 | 944  |
|    | EB-4 | 0.885 | 25 |      |    |      |    |      |      |
| 36 | EBP  | 0.895 | 35 | FB-2 | 15 | HC-1 | 15 | 0.45 | 817  |
|    | EB-4 | 0.885 | 35 |      |    |      |    |      |      |
| 37 | EB-2 | 0.900 | 70 | FB-2 | 15 | HC-1 | 15 | 0.45 | 890  |
| 38 | EB-4 | 0.885 | 70 | FB-2 | 15 | HC-1 | 15 | 0.45 | 854  |
| 39 | EB-1 | 0.884 | 70 | FB-2 | 15 | HC-5 | 15 |      | 999  |
| C11| EB-5 | 0.919 | 75 | FB-3 | 15 | HC-1 | 10 | 0.31 | 41   |
| C12| EB-5 | 0.919 | 75 | FB-4 | 15 | HC-1 | 10 | 0.36 | 68   |
| C13| EB-5 | 0.919 | 75 | FB-1 | 15 | HC-2 | 10 | 0.31 | 232  |
| C14| EB-5 | 0.919 | 75 | FB-4 | 15 | HC-2 | 10 | 0.33 | 68   |

TABLE 2-continued

| Examples | Ethylene Alpha-Olefin Polyolefin A | Density of Ethylene Alpha-Olefin | Weight % Ethylene Alpha-Olefin | Modified Ethylene Alpha-Olefin Polyolefin B | Weight % Modified Ethylene Alpha-Olefin | Elastomer Type | Weight % Elastomer | Total % MAN in Adhesive Blend | PEEL gm/25 mm |
|---|---|---|---|---|---|---|---|---|---|
| C15 | EB-5 | 0.919 | 55 | FB-1 | 15 | HC-1 | 30 | 0.74 | 114 |
| C16 | EB-5 | 0.919 | 55 | FB-2 | 15 | HC-1 | 30 | 0.76 | 145 |
| C17 | EB-5 | 0.919 | 55 | FB-3 | 15 | HC-2 | 30 | 0.64 | 109 |
| C18 | EB-5 | 0.919 | 55 | FB-2 | 15 | HC-2 | 30 | 0.68 | 463 |

EB-1 = ethylene—butene polymer, melt index = 0.8
EB-2 = ethylene—butene polymer, melt index = 5.0
EB-3 = ethylene—butene polymer, melt index = 1.0
EB-4 = ethylene—butene polymer, melt index = 2.2
EB-5 = ethylene—butene polymer, melt index = 1.4
EBP = ethylene—butene—propylene polymer, melt index = 12
FB-1 = high density polyethylene, density = 0.96, grafted with 0.87 weight % maleic anhydride, melt index = 2
FB-2 = high density polyethylene, density = 0.96, grafted with 0.97 weight % maleic anhydride, melt index = 11
FB-3 = ethylene—butene polymer, density = 0.93, grafted with 0.71 weight % maleic anhydride, melt index = 30
FB-4 = ethylene—butene polymer, density = 0.92, grafted with 1.02 weight % maleic anhydride, melt index = 1.4
HC-1 = ethylene—propylene diene rubber, grafted with 2.02 weight % maleic anhydride, melt index = 3
HC-2 = ethylene—propylene diene rubber, grafted with 1.77 weight % maleic anhydride, melt index = 0.5
HC-3 = ethylene—propylene diene rubber, grafted with 0.99 weight % maleic anhydride, melt index = 0.5
HC-4 = ungrafted ethylene propylene diene rubber, Mooney viscosity = 21
HC-5 = styrene—ethylene—butylene—styrene rubber, grafted with about 2 weight % maleic anhydride, from Shell (Kraton™ G1901X)

What is claimed is:

1. A multilayer structure consisting essentially of:
   a first layer comprising an ionomer or acid copolymer; and a second layer comprising a bonding resin consisting essentially of:
   a) a thermoplastic base polymer comprising:
      an ethylene-alpha olefin polymer having a density less than 0.915 and greater than or equal to 0.850 grams per cubic centimeter selected from ethylene-butene-propylene polymer or ethylene-butene polymer,; and
   b) an elastomer grafted with a carboxylic acid moiety or any of the following derivatives of a carboxylic acid moiety: anhydride, ester, amide, imide or metal salt, whereby the weight percent of a) in the second layer is in the range of 55–90 wt % and the weight percent of b) in the second layer is in the range of 10–30 wt %, and wherein the elastomer is selected from ethylene-propylene diene rubber or styrene-ethylene-butylene-styrene rubber.

2. A multilayer structure according to claim 1 further comprising an ethylene-alpha olefin modifier polymer grafted with a carboxylic acid moiety or an anhydride, ester, amide, imide or metal salt derivative of a carboxylic acid moiety, wherein the ethylene-alpha olefin modifier polymer has a density in the range of about 0.840 to about 0.970 grams per cubic centimeter.

* * * * *